April 6, 1937. W. R. GRISWOLD 2,076,180
MOTOR VEHICLE
Filed Sept. 28, 1934
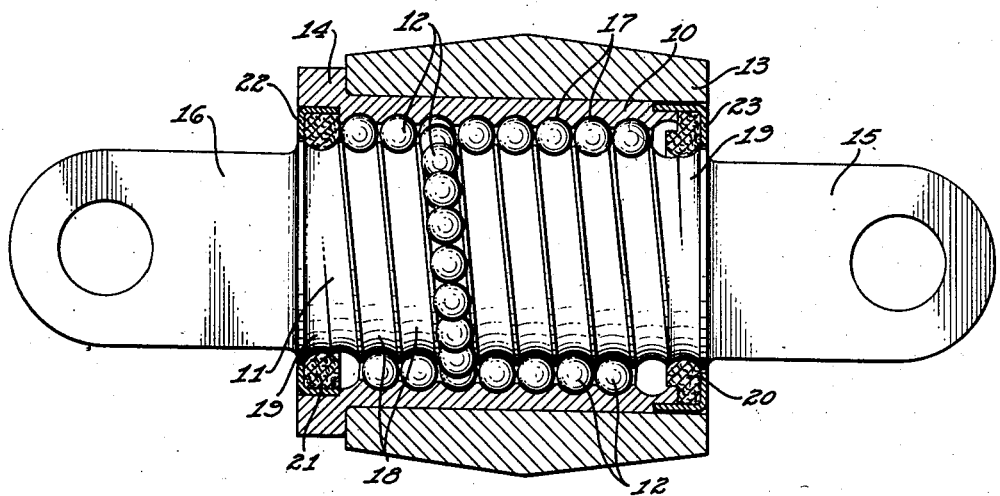
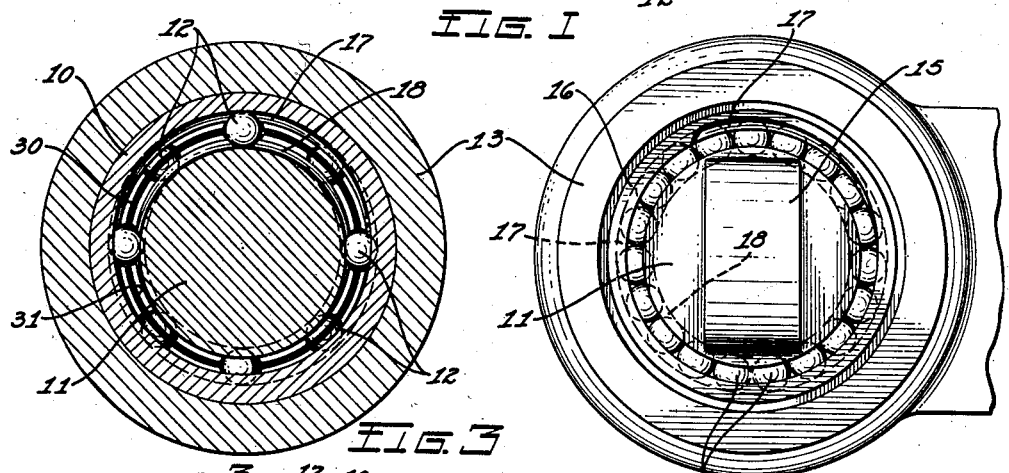
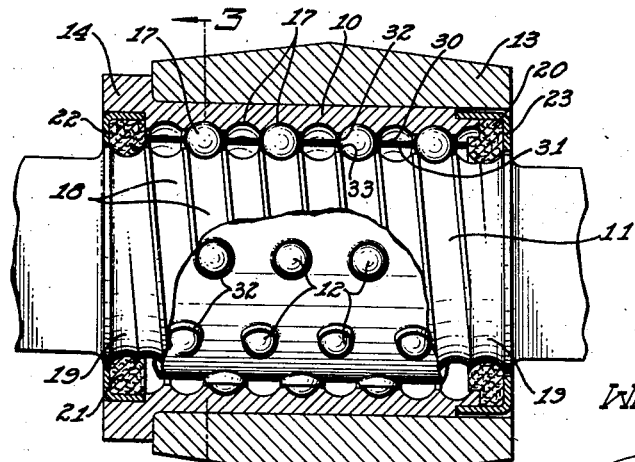
Inventor
WALTER R. GRISWOLD.

Patented Apr. 6, 1937

2,076,180

UNITED STATES PATENT OFFICE 2,076,180

MOTOR VEHICLE

Walter R. Griswold, Detroit, Mich., assignor to Packard Motor Car Company, Detroit, Mich., a corporation of Michigan Application September 28, 1934, Serial No. 745,896

11 Claims. (Cl. 308—233)

This invention relates to bearings and more particularly to bearings subjected to radial and thrust loads.

Bearings designed to take radial and thrust loads comprise telescopically arranged members separated by sets of circularly disposed anti-friction means such as balls. With such bearings, thrust load is taken generally by one set of anti-friction means while the radial load is taken mainly by the anti-friction means of each set lying between the members where force is applied. The distribution of load is thus unevenly taken by the anti-friction means and the capacity of the bearing structure is unduly limited.

An object of the invention is to provide a bearing of the type referred to in which radial and thrust loads are more evenly distributed on the anti-friction means and which will have a high load capacity.

Another object of the invention is to provide a bearing in which anti-friction means is arranged between telescoping members to take radial and thrust loads throughout the axial length.

A further object of the invention is to materially increase the radial and thrust load capacity of a bearing without dimension increase.

Still another object of the invention is to provide a bearing in which anti-friction means are arranged between telescoping members in a manner to increase the load capacity and the durability.

Other objects of the invention will appear from the following description taken in connection with the drawing, which forms a part of this specification, and in which:

Fig. 1 is a longitudinal sectional view of a bearing structure incorporating the invention;

Fig. 2 is an end view of the same with parts removed;

Fig. 3 is a sectional view of a bearing structure in which the invention takes a modified form, such sectional view being taken substantially on line 3—3 of Fig. 4;

Fig. 4 is a longitudinal sectional view of a bearing structure incorporating the invention in a modified form.

Referring now to the drawing by characters of reference, 10 and 11 designate two telescopically arranged bearing members which are spaced apart by anti-friction means such as balls 12. These telescopically arranged members are of a character such that one can be moved in a rotational direction relative to the other and, in the present instance, the member 10 is fixed in a housing 13 and is in the form of a sleeve having a flanged end 14. The member 11 is in the form of a shaft having arms 15 and 16 projecting from the ends thereof. The bearing structure illustrated is designed specifically as a mounting for link means for connecting a front steering wheel of a motor vehicle with the main frame to permit vertical movement thereof relative to the main frame, the housing 13 being fixed to the main frame of the vehicle.

It is the purpose of the invention to arrange the anti-friction means between the members 10 and 11 so that radial and thrust loads are more evenly distributed and the load capacity is high. To this end, a helical recess 17 is formed in the inner face of the member 10 and a helical recess 18 is formed on the periphery of the member 11, such recesses being complementary when the members 10 and 11 are assembled and forming therebetween a helical channel extending substantially the axial length of the members which is adapted to be filled with the balls 12.

The helical recess in the member 11 terminates at each end in a circular recess as indicated at 19, one purpose of which is to receive felt rings 20 and 21 which maintain the plurality of balls in the helical channel and serve as an oil retainer and a dust excluder. The felt ring 21 is maintained in the circular groove in the member 10 by a retainer ring 22 which is pressed into a circular recess formed in the flanged end of the sleeve member 10. The felt ring 20 is secured in position by means of a retainer ring 23 which is pressed onto a reduced end of the member 10. These felt rings are of such diameter that they seat in the recesses 19 and overlie the space between the members 10 and 11. The felt members and their retaining rings are arranged axially within the confines of the main perimeter of the member 10 to permit the bearing structure to be assembled as a unit and then pressed endwise into or out of the housing 13 without interference.

The helical recess 17 extends to the extreme end of the member 10 enclosed by the retainer 23. When the retainer 20 and its ring 23 are displaced axially from the groove 19 and the shaft 11 is moved to the right to expose such groove, then the balls can be fed into or removed from the helical channel. Such feature of the structure allows the bearing members to be assembled during loading or unloading of the balls.

In the modified form of the invention shown in Figs. 3 and 4, the bearing structure is substantially the same as that which has been previously described and differs in that there is a cage for the balls. The cage is formed of two sheet metal sleeves 30 and 31 having aligned openings therein with the edge portions adjacent the openings turned out in opposite directions to form retainers 32 and 33 for the balls. These openings are disposed in a helical direction around the cage in a relation complementary to the channel formed by the complementary recesses 17 and 18.

As above related, the member 11 is adapted to serve as a pivot for an element and can have a limited oscillating movement within the member 10. Due to the helical channel containing the anti-friction means, thrust load is taken substantially the entire length of the bearing structure and radial load is taken at substantially any point along the bearing structure normal to the axis of the members 10 and 11. Due to the arrangement of the balls between the members 10 and 11, the bearing will have a large radial and thrust load capacity as compared with a bearing in which sets of balls are contained in spaced circular grooves. Due to the helical arrangement of the balls between bearing members 10 and 11, the distribution of the thrust load in the bearing structure will be uniform and the radial load will be taken by an increased number of balls. It will thus be seen that the present bearing structure is of a character such that it will have an extremely high radial and thrust load capacity and will be extremely durable because of the distribution of radial and thrust loads.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A bearing comprising a pair of spaced telescoping members having complementary grooves in their adjacent faces forming a helically extending channel, a cage sleeve intermediate said members having openings therethrough, said openings being disposed in the channel, balls in the openings in said cage sleeve spacing said telescoping members, said balls transmitting radial and thrust loads uniformly, and means for holding said cage sleeve in substantially fixed axial relation with one of said members.

2. A bearing comprising two spaced telescoping members having complementary grooves in their adjacent faces forming a helically extending channel, the groove in one of said members terminating at each end in a circular groove, and balls seated in said channel spacing said bearing members, said balls transmitting radial and thrust loads uniformly.

3. A bearing comprising two spaced telescoping members having complementary grooves in their adjacent faces forming a helically extending channel, the groove in one of said members terminating at each end in a circular groove, balls seated in said channel spacing said bearing members and taking radial and thrust loads uniformly, and means extending into said annular grooves for sealing the space between said members.

4. A bearing comprising two spaced telescoping members having complementary grooves in their adjacent faces forming a helically extending channel, the groove of one of said members terminating at its ends in circular grooves, balls seated in said channel spacing said bearing members and taking substantially all radial and thrust loads uniformly, and ball retainer means arranged in said circular recesses, said retainer means preventing axial displacement of said balls from said channel.

5. A bearing comprising two spaced telescoping members having complementary grooves in their adjacent faces forming a helically extending channel, the groove in one of said members terminating at its ends in circular grooves, balls seated in said helically extending channel and spacing said bearing members, and felt sealing means carried by one of said members and extending into the circular recesses in the other member.

6. A bearing comprising a sleeve and a shaft extending through said sleeve, said shaft and sleeve having complementary grooves in their adjacent faces forming a helically extending channel, the groove in said shaft terminating at its ends in circular grooves, balls seated in the helical channel spacing said shaft and said sleeve, felt rings seated in the circular recesses in said shaft and engaging end portions of said sleeve, and retainer rings for the felt fixed on said sleeve.

7. A bearing comprising two spaced telescoping members having complementary grooves in their adjacent faces forming a helically extending channel, the groove in one of said members extending to an end thereof and the groove in the other member terminating in a circular recess in each end, and balls in the helically extending channel spacing said members apart in a relation to take radial and thrust loads uniformly, said balls being insertable or removable from the helical channel when the circular recess is moved beyond the groove extending to the end of said other member.

8. A bearing comprising a pair of radially spaced telescoping members having complementary grooves in their adjacent faces forming a helical channel, a pair of spaced substantially stationary retainer means in said channel fixed to one of said members, and balls filling the channel in abutting relation between said pair of retaining means, said balls spacing said members and transmitting radial and thrust loads uniformly.

9. A bearing comprising a fixed member, a rotatable member extending through said fixed member in radially spaced relation thereto, the adjacent surfaces of said members having complementary grooves therein forming a helical channel, retainer means fixed within the ends of said fixed member and projecting into the groove in the rotatable member, and freely mounted balls filling the channel and held therein in abutting relation by said retainer means, said balls spacing said members and transmitting radial and thrust loads uniformly.

10. A bearing comprising a pair of radially spaced telescoping members having complementary grooves in their adjacent faces forming a helical channel, a pair of axially spaced retainer means in said channel fixed to one of said members, and freely mounted balls filling the channel and held in abutting relation and in a definite relation lengthwise of the channel portion of the fixed member by said pair of retainer means, said balls spacing said members and transmitting radial and thrust loads uniformly.

11. A bearing comprising a pair of spaced telescoping members having complementary grooves in their adjacent faces forming a helically extending channel, a cage sleeve intermediate said members having openings therethrough, said openings being disposed in the channel, balls in the openings in said cage sleeve seated in the grooves in said telescoping members to space the same, and retainer means fixing the cage sleeve axially with one of said members.

WALTER R. GRISWOLD.